United States Patent [19]

Agarwal

[11] Patent Number: 5,758,092
[45] Date of Patent: May 26, 1998

[54] INTERLEAVED BITRATE CONTROL FOR HETEROGENEOUS DATA STREAMS

[75] Inventor: Rohit Agarwal, Hillsboro, Oreg.

[73] Assignee: Intel Corporation, Santa Clara, Calif.

[21] Appl. No.: 557,454

[22] Filed: Nov. 14, 1995

[51] Int. Cl.$^6$ ........................................ H04N 7/30
[52] U.S. Cl. ............... 395/200.77; 348/515; 711/157
[58] Field of Search ................ 364/514 R, 715.02; 395/200.18, 484, 200.77; 348/27, 15, 405, 390–392, 416, 407, 415, 421, 419, 399, 422, 17, 515; 382/251, 253; 375/245, 246; 341/143; 711/157

[56] References Cited

U.S. PATENT DOCUMENTS

| | | | |
|---|---|---|---|
| 4,893,123 | 1/1990 | Boisson | 341/143 |
| 4,933,761 | 6/1990 | Murakami et al. | 348/422 |
| 5,046,071 | 9/1991 | Tanoi | 375/245 |
| 5,097,330 | 3/1992 | Guichard et al. | 348/399 |
| 5,122,877 | 6/1992 | Keesman | 348/421 |
| 5,134,476 | 7/1992 | Aravind et al. | 348/415 |
| 5,150,209 | 9/1992 | Baker et al. | 348/407 |
| 5,317,397 | 5/1994 | Odaka et al. | 348/416 |
| 5,333,012 | 7/1994 | Singhal et al. | 348/405 |
| 5,351,085 | 9/1994 | Coelho et al. | 348/391 |
| 5,367,629 | 11/1994 | Chu et al. | 382/253 |
| 5,493,513 | 2/1996 | Keith et al. | 364/514 R |
| 5,512,939 | 4/1996 | Zhou | 348/17 |
| 5,543,846 | 8/1996 | Yagasaki | 348/415 |
| 5,576,766 | 11/1996 | Matsumoto et al. | 348/407 |
| 5,602,592 | 2/1997 | Mori et al. | 348/415 |

OTHER PUBLICATIONS

Kronander, "Post–and Pre–Processing in Coding of Image Sequences Using Filters with Motion Compensated History" 1988 Int. Conf. Acoustics, Speech. Sig. Processing, vol. 2, Apr. 1988, pp. 1104–1107.

Primary Examiner—James P. Trammell
Assistant Examiner—Hal D. Wachsman
Attorney, Agent, or Firm—N. Stephan Kinsella, Esq.; William H. Murray, Esq.

[57] ABSTRACT

A heterogeneous multimedia stream has interleaved samples of two or more different substream types. For example, a heterogeneous video stream may have interleaved intra, predicted, and bi-directional frames. In addition to a global bit bank, a different bit bank is maintained for each different frame type. A global quantization level is selected for each frame based on the global bit bank and the bit bank for the corresponding frame type. The frames are encoded using the selected global quantization levels. In a preferred embodiment, the number of bits available for encoding frames differs based on the frame type. In addition, any unused bits from encoding the current frame are shifted from the bit bank corresponding to the current frame type to a bit bank of a different frame type.

54 Claims, 10 Drawing Sheets

FIG. 2. DECODING SYSTEM

FIG. 3. COMPRESSION PROCESSING

FIG. 6. ENCODE PROCESSING

FIG. 8. DECOMPRESSION PROCESSING
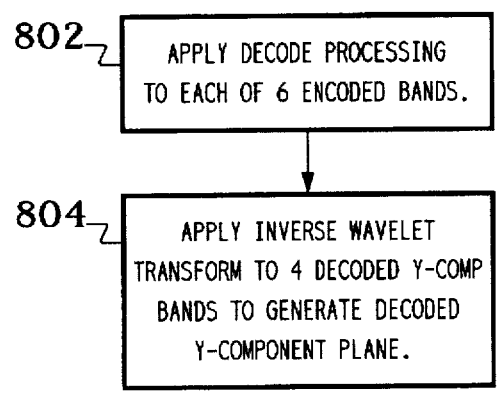

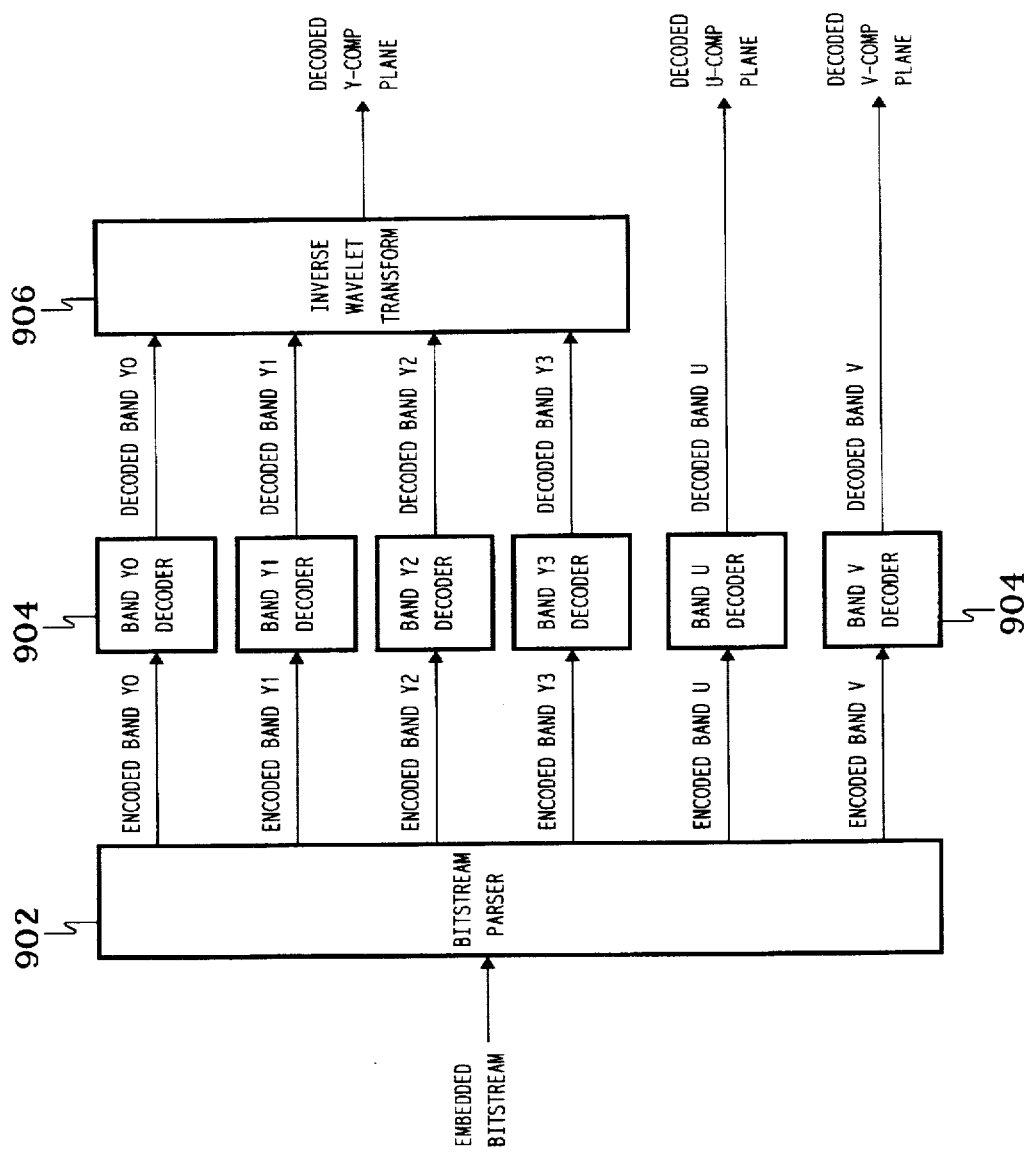
FIG. 9. DECODER

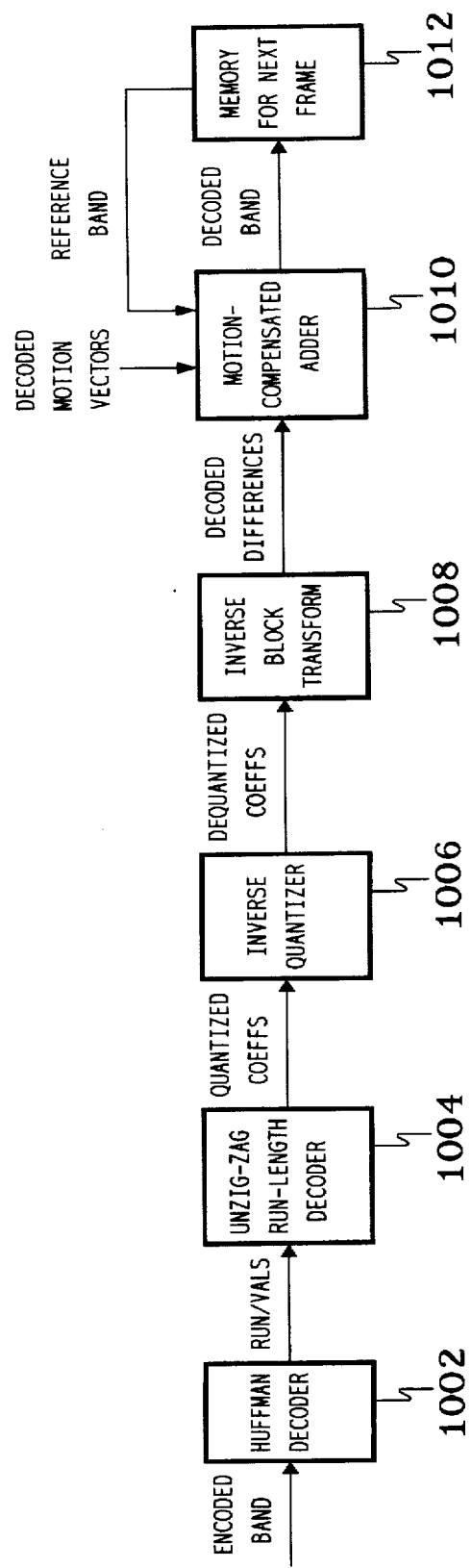
FIG. 10. DECODE PROCESSING

INTERLEAVED BITRATE CONTROL FOR HETEROGENEOUS DATA STREAMS

CROSS-REFERENCES TO RELATED APPLICATIONS

This application is related to U.S. Pat. application No. 08/537,091, filed Sep. 29, 1995 as attorney docket no. 366431-046 ("the '091 application"), the pending teachings of which are incorporated herein by reference.

BACKGROUND OF THE INVENTION

1. Field of the Invention

The present invention relates to signal processing, and, in particular, to the compression and decompression of video signals.

2. Description of the Related Art

In many conventional video encoding schemes, video signals are quantized as part of the overall effort to reduce the size of the encoded bitstream. These encoding schemes allow the degree to which the video signals are quantized to vary from frame to frame. Increasing the degree of quantization decreases the size of the encoded bitstream, but also decreases the video quality.

One reason for allowing the degree of quantization to vary within a sequence of video frames is to attempt to achieve a uniform bitrate (i.e., roughly the same number of bits for each encoded video frame). A uniform bitrate can be particularly important in video systems with limited transmission bandwidth in order to achieve uniform playback of video images without requiring extensive buffering of video data.

Some video encoding schemes encode different frames within a video stream using different encoding techniques. For example, a particular video encoding scheme may encode frames using either intraframe encoding or interframe encoding. In intraframe encoding, a frame is encoded without reference to any other frames, while, in interframe encoding, a frame may be encoded with reference to one or more other frames. Furthermore, interframe encoding may involve either uni-directional encoding or bi-directional encoding. In uni-directional encoding, a frame is encoded with reference to a single (typically previous) frame, while, in bi-directional encoding, a frame is encoded with reference to two frames—a previous frame and a subsequent frame.

In such video encoding schemes, the resulting encoded bitstream comprises an interleaved sequence of frames encoded using different encoding schemes. Such a bitstream may be referred to as a heterogeneous data stream, because the single bitstream comprises different types of encoded data. For example, a video sequence may be encoded by repeating the following encoding pattern:

I1 B2 B3 P4 B5 B6 P7 B8 B9 P10 B11 B12 P13 B14 B15 I16 where "I" indicates intraframe encoding, "B" indicates bi-directional interframe encoding, and "P" indicates uni-directional interframe encoding. In this sequence, I1 is intra encoded; B2 and B3 are bi-directionally encoded with respect to I1 and P4; P4 is inter encoded with respect to I1; B5 and B6 are bi-directionally encoded with respect to P4 and P7; P7 is inter encoded with respect to P4; etc. This frame sequence is encoded for subsequent transmission to a decoder in the following order:

I1 P4 B2 B3 P7 B5 B6 P10 B8 B9 P13 B11 B12 I16 B14 B15

This encoding order allows, for example, P4 to be decoded prior to B2 and B3, so that decoded P4 can be used as a reference in decoding B2 and B3.

When a video stream is encoded, the encoder determines the degree of quantization to apply to each of the frames. When the degree of quantization is selected to achieve a target bitrate, conventional video encoders monitor the performance of the video encoding process by tracking the actual number of bits in the encoded bitstream versus the ideal target bitrate. This is often done by monitoring the number of available bits in a hypothetical bit bank. As each frame is encoded, the number of bits corresponding to the target bitrate is added to the bit bank and the actual number of bits for the encoded frame are subtracted. If the bit bank starts to fill up, then too many bits are being used and the video encoder will react by increasing the degree of quantization for subsequent frames. If the bit bank starts to empty out, then extra bits are available and the video encoder will decrease the degree of quantization for subsequent frames.

The degree of quantization (also called quantization level) is just one factor that can affect the size of an encoded frame. The content of the current video frame (and, for interframe encoding, the content of the reference frames used to encode the current video frame) are also factors. The technique used to encode the frame is a further factor. Typically, intraframe encoding takes more bits per frame than interframe encoding. In order to achieve a uniform bitrate, intra-encoded frames may need to be more highly quantized than inter-encoded frames.

Conventional video encoding schemes which use a single bit bank to determine quantization level treat a heterogeneous video stream as if it were a homogeneous stream (i.e., having only a single type of frame). Such encoding schemes tend to distribute bits non-judiciously between different frame types. In addition, they do not account for the interdependence of the different frame types. For example, allocating too few bits for an intra-encoded frame means that the sizes of subsequent inter-encoded frames that are predicted from the bit-deficient intra frame will automatically increase due to poor prediction. What is needed are video encoding and decoding schemes that account for the different types of video frames within a heterogeneous video stream.

It is accordingly an object of this invention to overcome the disadvantages and drawbacks of the known art and to provide video encoding and decoding schemes that are designed for heterogeneous video streams.

Further objects and advantages of this invention will become apparent from the detailed description of a preferred embodiment which follows.

SUMMARY OF THE INVENTION

The present invention comprises computer-implemented processes, apparatuses, and storage mediums encoded with machine-readable computer program code for encoding multimedia signals. According to a preferred embodiment, a heterogeneous multimedia stream is provided comprising interleaved samples of two or more different substream types. A different bit bank is maintained for each different substream type. An encoding parameter value for a current frame is generated based on the bit bank corresponding to the substream type for the current sample, and the current sample is encoded using the selected encoding parameter value to generate an encoded bitstream.

The present invention also comprises computer-implemented processes, apparatuses, and storage mediums encoded with machine-readable computer program code for decoding encoded multimedia signals. According to a preferred embodiment, an encoded multimedia bitstream is provided and decode to generate a decoded multimedia stream, wherein the encoded multimedia bitstream has been generated by (a) providing a heterogeneous multimedia stream comprising interleaved samples of two or more different substream types; (b) maintaining a different bit bank for each different substream type; (c) generating an encoding parameter value for a current sample based on the bit bank corresponding to the substream type for the current sample; and (d) encoding the current sample using the selected encoding parameter value to generate an encoded bitstream.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 8 is a process flow diagram of the decompression processing implemented by the decode system of FIG. 2 for each encoded frame of the encoded video bitstream;

FIG. 9 is a block diagram of a decoder that implements the decompression processing of FIG. 8; and FIG. 10 is a block diagram of the decode processing of FIG. 8 that is applied to each encoded band of each interframe-encoded frame of the encoded video bitstream.

DESCRIPTION OF THE PREFERRED EMBODIMENT(S)

The present invention is directed to video encoding and decoding schemes for video streams having different types of frame (e.g., intra-encoded frames and inter-encoded frames). In addition to a global bit bank, a bit bank is maintained for each different frame type. A global quantization level is selected for the current frame based on the global bit bank and the bit bank corresponding to the current frame type. The frames are encoded using the selected quantization levels.

System Hardware Architectures

Figure 1:
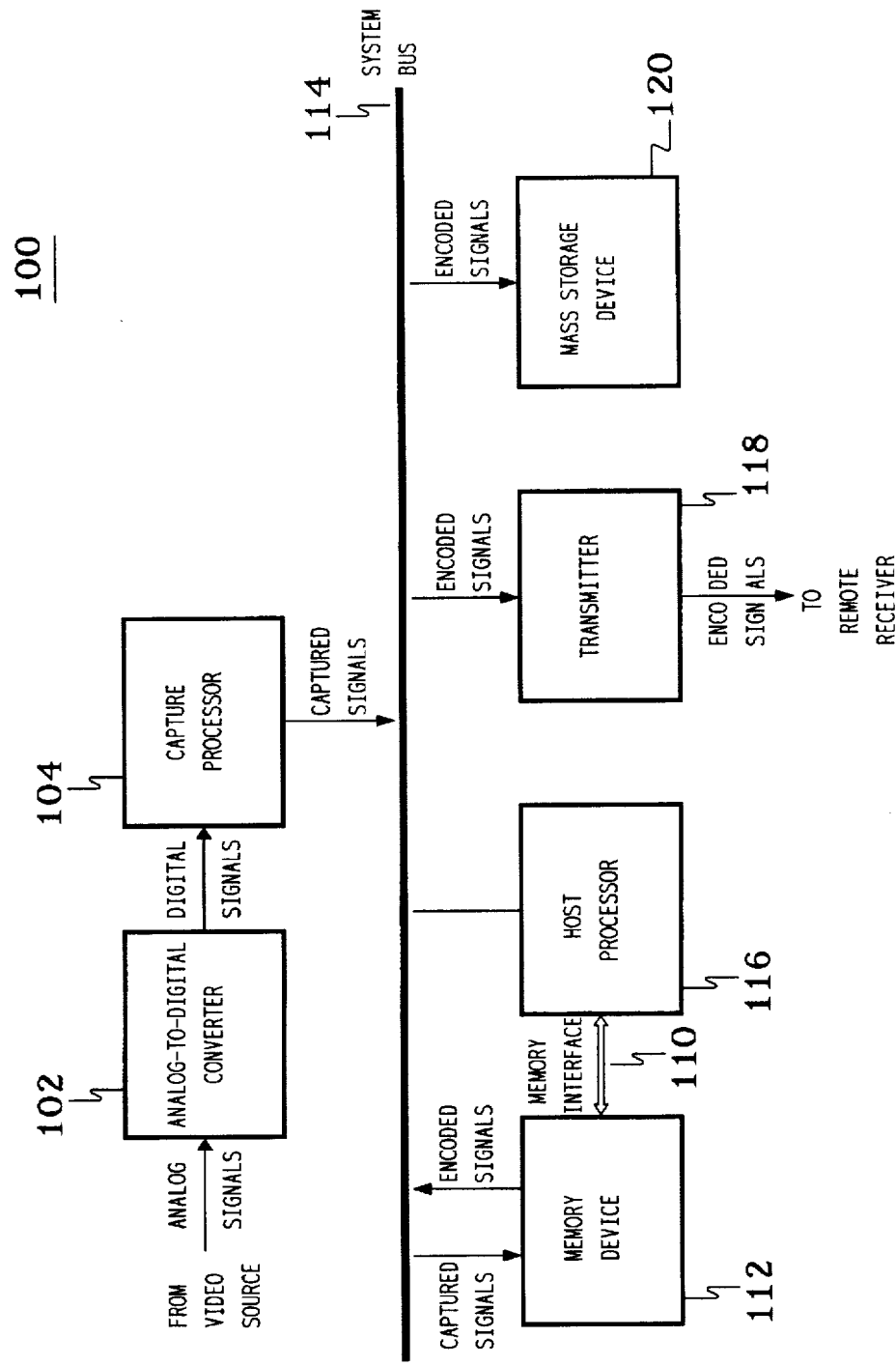
FIG. 1 is a block diagram of a video system for processing video signals in a PC environment, according to one embodiment of the present invention.

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in one embodiment, 8-bit R, G, and B component signals).

Capture processor 104 captures the digitized component signals received from converter 102. Capturing may include one or more of color conversion (e.g., RGB to YUV), scaling, and subsampling. Each captured video frame is represented by a set of three two-dimensional component planes, one for each component of the digitized video signals. In one embodiment, capture processor 104 captures video signals in a YUV9 (i.e., YUV 4:1:1) format, in which every (4×4) block of pixels of the Y-component plane corresponds to a single pixel in the U-component plane and a single pixel in the V-component plane. Capture processor 104 selectively stores the captured signals to memory device 112 and/or mass storage device 120 via system bus 114. Those skilled in the art will understand that, for real-time encoding, the captured signals are preferably stored to memory device 112, while for non-real-time encoding, the captured signals are preferably stored to mass storage device 120.

During real-time encoding, host processor 116 reads the captured bitmaps from memory device 112 via high-speed memory interface 110 and generates encoded video signals that represent the captured video signals. Depending upon the particular encoding scheme implemented, host processor 116 applies a sequence of compression steps to reduce the amount of data used to represent in the information in the video signals. The encoded video signals are then stored to memory device 112 via memory interface 112 and/or mass storage device 120 via system bus 114. Host processor 116 may copy the encoded video signals to mass storage device 120 and/or transmit the encoded video signals to transmitter 118 for real-time transmission to a remote receiver (not shown in FIG. 1).

Figure 2:
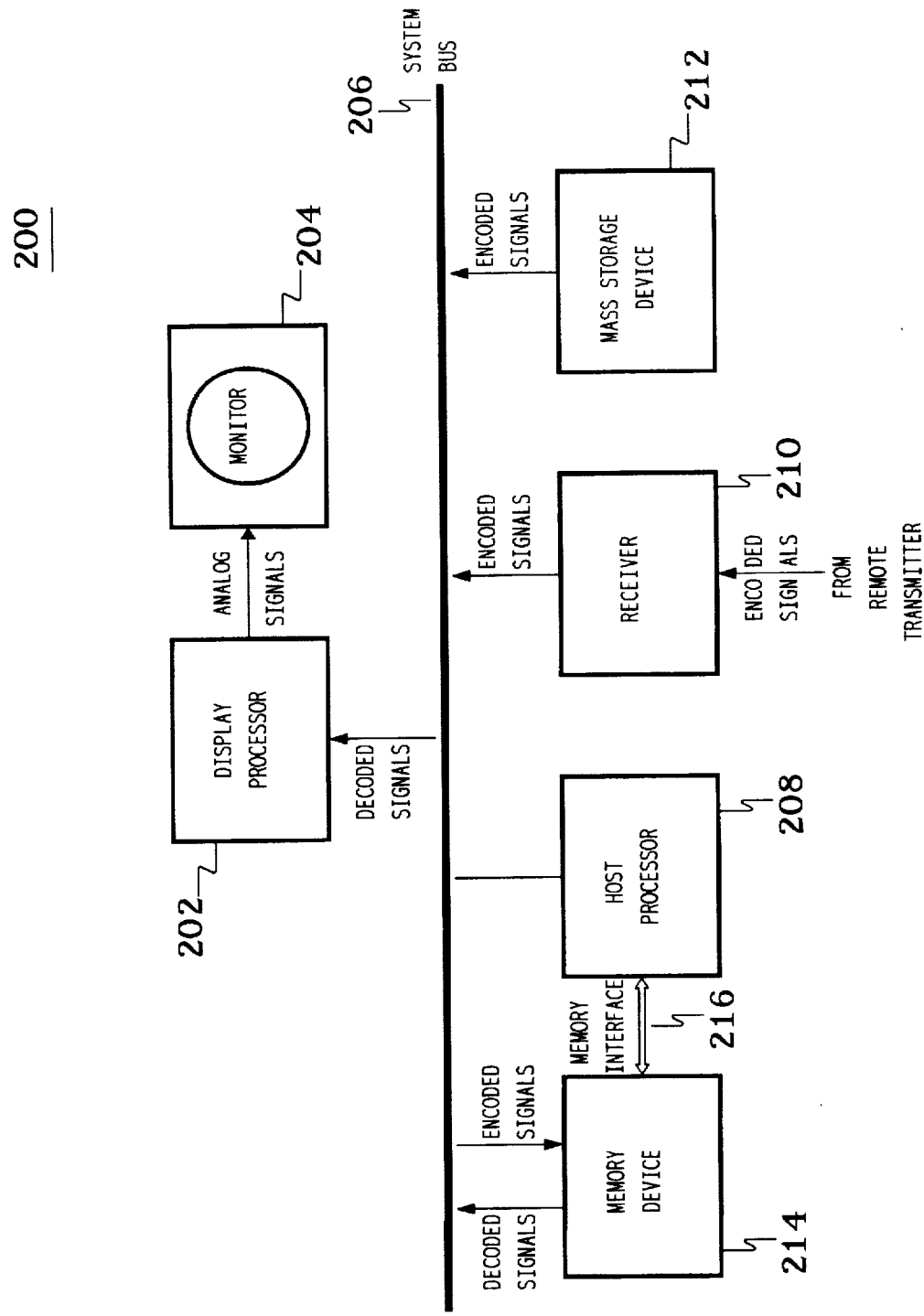
FIG. 2 is a computer system for decoding the video signals encoded by the computer system of FIG. 1, according to one embodiment of the present invention.

Referring now the FIG. 2, there is shown a computer system 200 for decoding the video signals encoded by encoding system 100 of FIG. 1, according to a preferred embodiment of the present invention. Encoded video signals are either read from mass storage device 212 of decoding system 200 or received by receiver 210 from a remote transmitter, such as transmitter 118 of FIG. 1. The encoded video signals are stored to memory device 214 via system bus 206.

Host processor 208 accesses the encoded signals stored in memory device 214 via high-speed memory interface 216 and decodes the encoded video signals for display. Decoding the encoded video signals involves undoing the compression processing implemented by encoding system 100 of FIG. 1. Host processor 208 stores the decoded video signals to memory device 214 via memory interface 216 from where they are transmitted to display processor 202 via system bus 206. Alternatively, host processor 208 transmits the decoded video signals directly to display processor 202 via system bus 206. Display processor 202 processes the decoded video signals for display on monitor 204. The processing of display processor 202 includes digital-to-analog conversion of the decoded video signals. After being decoded by host processor 208 but before being D/A converted by display processor 202, the decoded video signals may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digitized video component signals as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably an Intel® general-purpose microprocessor such as an Intel® i486™, Pentium™, or higher processor. System bus 114 may be any suitable digital signal transfer device and is preferably a Peripheral Component Interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding encoded video signals and is preferably an Intel® general purpose microprocessor such as an Intel® i486™, Pentium™, or higher processor. System bus 206 may be any suitable digital signal transfer device and is preferably a PCI bus. Mass storage device 212 may be any suitable means for storing digital signals and is preferably a CD-ROM device or a hard drive. Receiver 210 may be any suitable means for receiving the digital signals transmitted by transmitter 118 of encoding system 100. Display processor 202 and monitor 204 may be any suitable devices for processing and displaying video signals (including the conversion of digital video signals to analog video signals) and are preferably parts of a PC-based display system having a PCI graphics board and a 24-bit RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video signals. Those skilled in the art will understand that such a combined system may be used to display decoded video signals in real-time to monitor the capture and encoding of video signals.

In alternative embodiments of present invention, the video encode processing of an encoding system and/or the video decode processing of a decoding system may be assisted by a pixel processor, such as an Intel® i750PE™ processor, or other suitable component(s) to off-load processing from the host processor by performing computationally intensive operations.

Encode Processing

Figure 3:
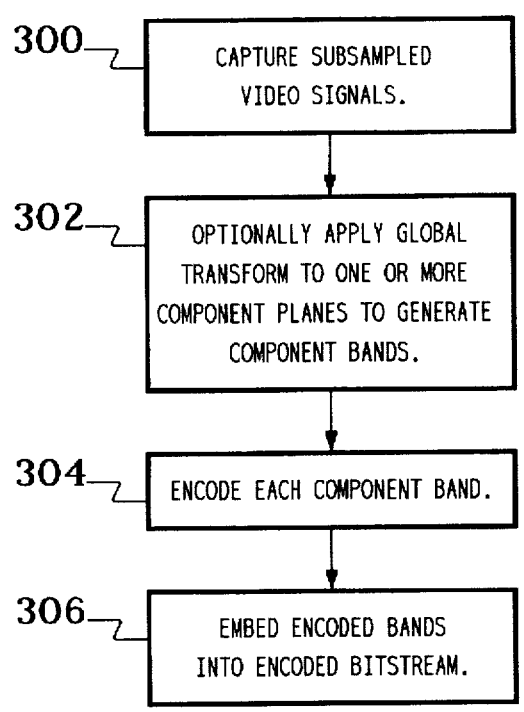
FIG. 3 is a process flow diagram of the compression processing implemented by the system of FIG. 1 for each frame of a video stream.

Referring now to FIG. 3, there is shown a process flow diagram of the compression processing implemented by encode system 100 of FIG. 1 for each frame of a video stream, according to a preferred embodiment of the present invention. The RGB24 signals generated by A/D converter 102 are converted to YVU24 signals by capture processor 104, and capture processor 104 subsamples the YVU24 signals to generate subsampled YVU9 signals (step 300 of FIG. 3).

Figure 4:
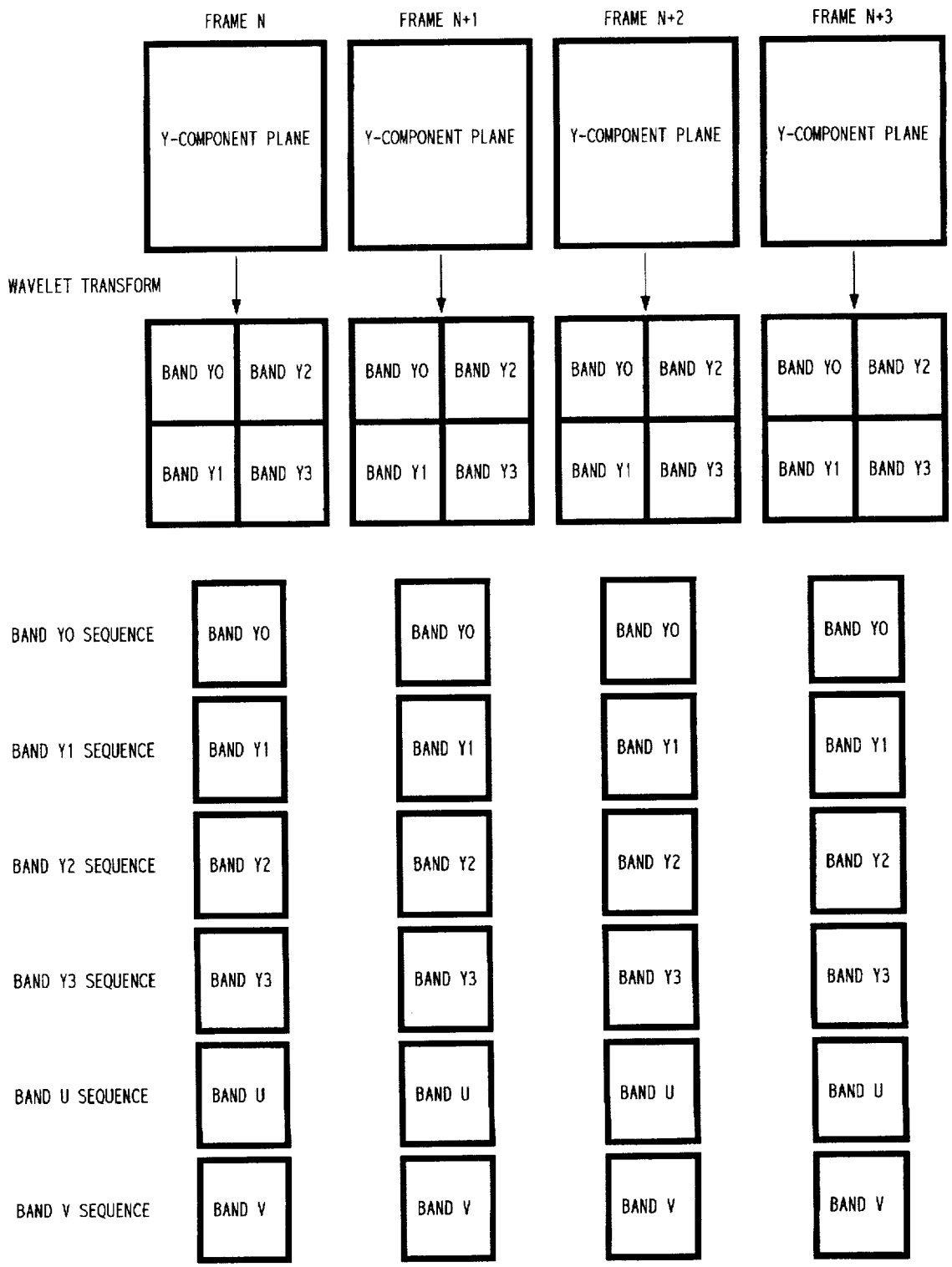
FIG. 4 shows a graphical representation of the six band sequences for the compression processing of FIG. 3.

Compression processing for each frame begins by optionally applying a global transform to one or more of the component planes to decompose the component planes into a plurality of bands (step 302). For example, a forward wavelet transform may be applied to the Y-component plane to globally decompose (i.e., transform) the Y-data into four separate bands of data, thereby producing a total of six bands of data for each frame: four Y-component bands, one U-component band, and one V-component band. FIG. 4 shows a graphical representation of the six band sequences. A preferred forward wavelet transform is described in further detail in the '091 application in the section entitled "Wavelet Transform."

For purposes of this specification, the four Y-component bands are designated Band Y0, Band Y1, Band Y2, and Band Y3. The subsampled U-component plane (which is not wavelet transformed) is designated Band U, and the subsampled V-component plane (which is also not wavelet transformed) is designated Band V.

Encode processing is then applied to each of the bands of the current frame (step 304 of FIG. 3), where each band is part of a distinct band sequence (e.g., see FIG. 4). The encoded bands are then embedded into the compressed video bitstream to complete the compression processing for the current frame (step 306). Steps 300–306 of FIG. 3 are repeated for each frame of the video stream.

Figure 5:
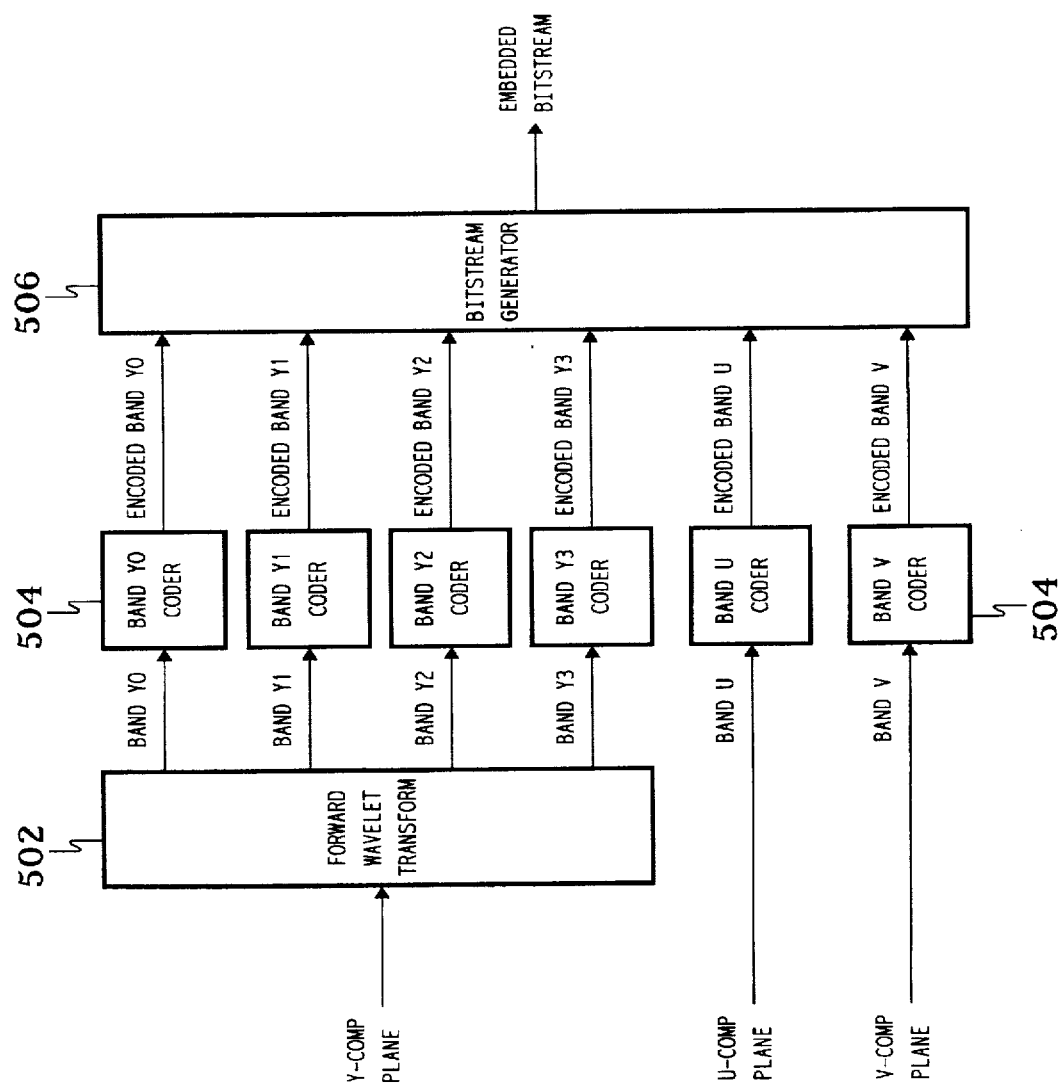
FIG. 5 is a block diagram of an encoder that implements the compression processing of FIG. 3.

Referring now to FIG. 5, there is shown a block diagram of an encoder that implements the compression processing of FIG. 3, when the forward wavelet transform is applied to only the Y-component plane. Transform 502 applies a forward wavelet transform to the Y-component plane of each frame to generate Bands Y0–Y3. Coders 504 encode the six bands of data and bitstream generator 506 embeds the resulting encoded bands into the encoded video bitstream. In a preferred embodiment, there is a single coder 504 that sequentially encodes the different bands.

Figure 6:
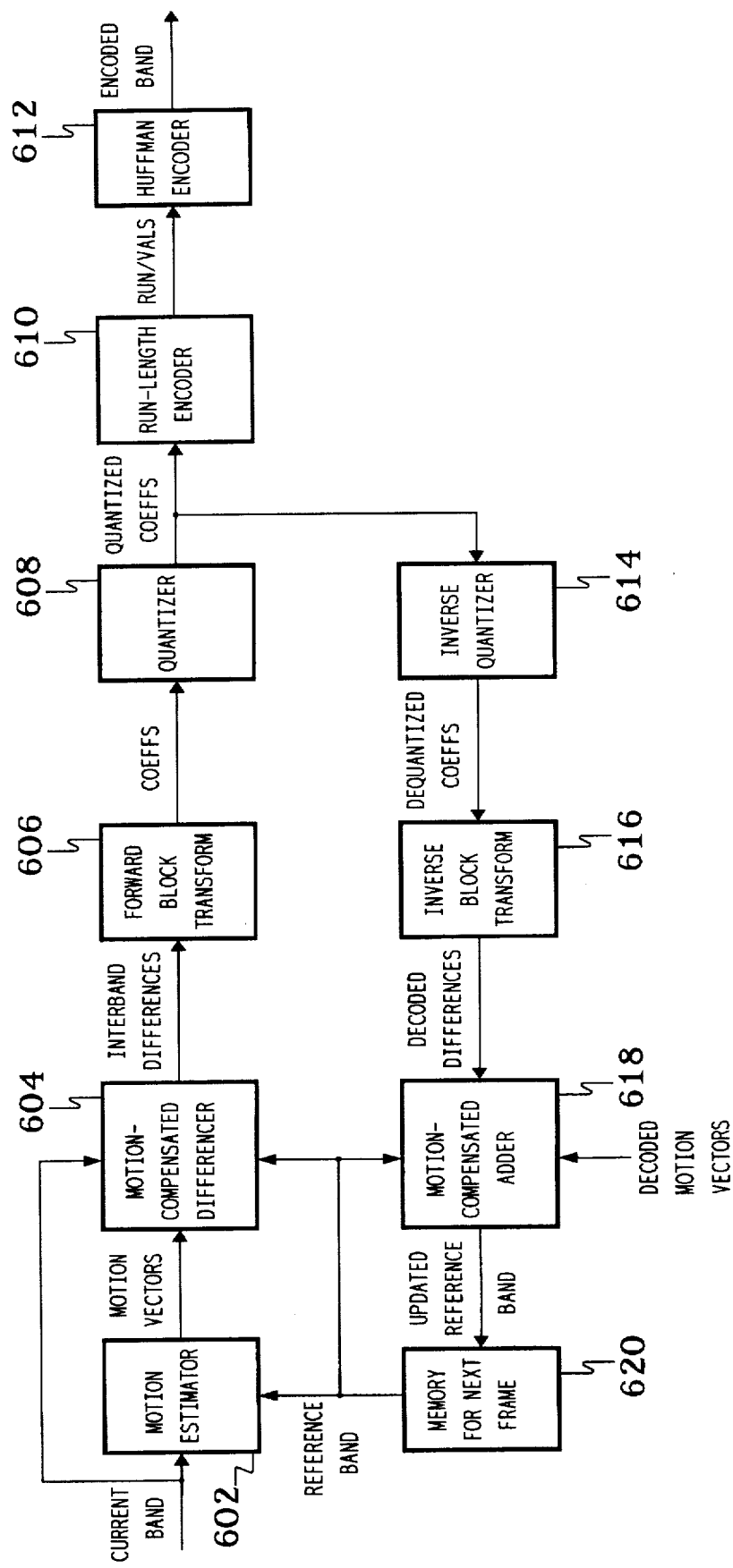
FIG. 6 is a block diagram of the encode processing of FIG. 3 which is applied to the difference blocks of each band of each inter-encoded frame of the video stream.

Referring now to FIG. 6, there is shown a block diagram of the processing of step 304 of FIG. 3 for encoding the difference blocks of each band of each inter-encoded frame of the video stream, according to one embodiment of the present invention. Those skilled in the art will understand that, in a video codec that employs interframe encoding, some of the frames are preferably encoded using only intraframe encoding. It will be further understood that each block of an inter-encoded frame may be encoded as either an intra block (i.e. using intraframe encoding) or a difference block (i.e., using interframe encoding).

In a preferred embodiment of the present invention, two different types of frames are encoded using interframe encoding (i.e., delta frames and bi-directional frames) and two different types of frames are encoded using intraframe encoding (i.e., key frames and intra frames).

A delta (D) frame is encoded with respect to a reference frame that corresponds to a previous frame. Each block of a D frame is encoded as either a difference block (i.e., using uni-directional interframe encoding) or an intra block (i.e., using intraframe encoding). A bi-directional (B) frame is encoded with respect to two reference frames: a previous reference frame corresponding to a previous frame and a subsequent reference frame corresponding to a subsequent frame. Each block of a B frame is encoded as either a difference block with respect to the previous reference frame, a difference block with respect to the subsequent reference frame, or an intra block. Delta and bi-directional frames are also collectively known as predicted frames. In one embodiment, a D frame may be used to generate a reference for other frames (e.g., a subsequent B or D frame, or a previous B frame), but a B frame may not be used to generate a reference for another frame. As such, B frames are disposable frames that a decoder may skip without adversely affecting any other frames.

Key (K) frames and intra (I) frames are both encoded without reference to any other frames. As such, each block of a K or I frame is encoded as an intra block. Both K and I frames may be used as references for subsequent B or D frames. In one embodiment, the difference between K and I frames is that an I frame may be used as a reference for a previous B frame, while a K frame may not.

The selection of how to encode a sequence of frames is preferably dictated by a set of parameters that specify a K frame interval, an I frame interval, a predicted frame interval, a frame rate, and whether bi-directional prediction is enabled. An example of a possible frame sequence is as follows:

I1 B2 B3 P4 B5 B6 P7 B8 B9 P10 B11 B12 P13 B14 B15 I16

In this sequence, I1 is intra encoded; B2 and B3 are bi-directionally encoded with respect to I1 and P4; P4 is inter encoded with respect to I1; B5 and B6 are bi-directionally encoded with respect to P4 and P7; P7 is inter encoded with respect to P4; etc. This frame sequence is encoded and transmitted to the decoder in the following order:

I1 P4 B2 B3 P7 B5 B6 P10 B8 B9 P13 B11 B12 I16 B14 B15

This encoding order allows, for example, P4 to be decoded prior to B2 and B3, so that decoded P4 can be used as a reference in decoding B2 and B3. This decoding scheme introduces a one-frame latency in the decode process, because the decoded B frames are delayed by one frame during which the next I or P frame is decoded.

The encoding of intra blocks is equivalent to the encoding of difference blocks shown in FIG. 6, except that the motion estimation of 602 and motion-compensated differencing of 604 are not performed. Intra encoding is applied to all of the blocks of K and I frames as well as the intra blocks of D and B frames.

For D frames, motion estimator 602 of FIG. 6 is selectively enabled to perform motion estimation on macroblocks of the current band relative to a reference band to generate a set of motion vectors for current band, where the D-frame reference band is generated by decoding the corresponding encoded band for a previous frame. (A block may correspond to an (8×8) set of pixels, while a macroblock may correspond to a (2×2) array of blocks (i.e., a (16×16) set of pixels).) For B frames, motion estimator 602 performs motion estimation on macroblocks of the current band with respect to two reference bands: one corresponding to a previous frame and one corresponding to a subsequent frame. When motion estimator 602 is disabled, no motion estimation is performed and zero motion vectors are used by motion-compensated differencer 604. The processing of motion estimator 602 is described in further detail in the '091 application in the section entitled "Motion Estimation."

The motion vectors generated by motion estimator 602 are encoded into the compressed video bitstream. The motion vectors are preferably encoded using spatial differencing, in which each motion vector is encoded based on its difference from the previous motion vector (i.e., the adjacent motion vector following a particular scan sequence). The motion vector spatial differences are then Huffman encoded to generate the encoded motion vectors for the compressed video bitstream.

When motion vector inheritance is enabled, motion estimation is performed only on the first band of the Y-component plane (e.g., Band Y0 when the Y plane is globally decomposed using the wavelet transform). In that case, the motion vectors for the first Y band are used during motion-compensated differencing for all of the rest of the bands of the current frame. When motion vector inheritance is disabled, motion estimation is performed independently on each band of the current frame. Those skilled in the art will understand that motion vector inheritance may result in substantially faster encoding and slightly faster decoding.

Motion-compensated differencer 604 applies the appropriate motion vectors to the reference band to generate a motion-compensated reference band. Differencer 604 also generates interband differences for the current band using the motion-compensated reference band and the current band.

In a K or I frame, each block is encoded as an intra block. In a D or B frame, some of the blocks may be encoded as difference blocks, while others may be encoded as intra blocks. In general, it is desirable to encode a block using the technique that results in the lowest number of bits of encoded data. One approach would be to encode each block using both intra-encoding and inter-encoding to determine which results in the fewer number of bits. This approach may be too time consuming for many applications.

In an alternative embodiment, the results of intra-encoding and inter-encoding are estimated using an Intra Grad measure and a SAD measure, respectively. The Intra Grad measure is generated for each macroblock by (1) generating the mean of the pixels in the macroblock and (2) then generating the sum of the absolute differences between that mean and the pixels of the macroblock. The SAD measure for each macroblock is the sum of the absolute values of the motion-compensated interband differences generated by differencer 604.

For D and B frames, each block of a macroblock is designated as an intra block, if the Intra Grad measure is less than the SAD measure for that macroblock. Otherwise, the blocks of the macroblock are designated as a difference block.

The Intra Grad measure is also used to determine the quantization level for each macroblock of the current band. Each macroblock of the current band is assigned a value (QDelta) that corresponds to the deviation of the Q level (Qlevel) for the current macroblock from a global Q level (GlobalQuant). The determination of the global Q level is described in further detail later in this specification in the section entitled "Bit-Rate Control." In a preferred embodiment:

QDelta=−8*log2((Gradi+2*MeanGrad)/(2*Gradi+MeanGrad))
if(Qlevel<8)Qdelta=0 where:
  o Gradi is the Intra Grad measure for macroblock i; and
  o MeanGrad is the average Intra Grad for the entire band.

A forward block transform 606 is applied to each block to generate coefficients for the current band. In a preferred embodiment, transform 606 may selectively apply any of the following transforms: a DCT transform, a slant transform, a Haar transform, or a "Slaar" transform which is a hybrid of a slant transform and a Haar transform. The selected transform may be either a one-dimensional or two-dimensional transform, and may differ from band to band. In addition, transform 606 may be disabled for any band, so that the block signals are not transformed before quantization. The processing of forward block transform 606 is described in further detail in the '091 application in the sections entitled "Block Transform" and "Decode Rate Control."

Quantizer 608 quantizes the coefficients to generate quantized coefficients for the current band. Quantizer 608 applies uniform scalar quantization, wherein each coefficient is divided by a specified integer scale factor. The processing of quantizer 608 is described in further detail in the '091 application in the section entitled "Adaptive Quantization."

Run-length encoder 610 transforms the quantized coefficients into run-length encoded (RLE) data. In a preferred embodiment, the RLE data for each block of quantized coefficients consist of a sequence of run/val pairs, where each run/val pair is a non-zero quantized coefficient followed by a value corresponding to a run of zero coefficients (i.e., coefficients that are quantized to zero). In a preferred embodiment, the run-length encoding follows an adaptively-generated pattern that tends to provide a long run of zero coefficients for the last run of the block. The processing of run-length encoder 610 is described in further detail in the '091 application in the section entitled "Adaptive Run-Length Encoding."

Huffman encoder 612 applies Huffman-type entropy (a.k.a. statistical or variable-length) coding to the RLE data to generate the encoded data for the current band.

The encode processing of FIG. 6 also includes the decoding of the encoded band to update the reference band used in encoding the corresponding band of another video frame. Since the run-length and Huffman encoding are lossless encoding steps, the decode loop of the encode processing preferably begins at inverse quantizer 614, which dequantizes the quantized coefficients to generate dequantized coefficients for the current band. It will be understood that the decoding processing of FIG. 6 is not performed for B frames, since B frames are not used to generate references for encoding other frames.

Inverse block transform 616 applies the inverse of forward block transform 606 to the dequantized coefficients to generate decoded differences for the current band. Motion-compensated adder 618 applies decoded motion vectors (generated by decoding the encoded motion vectors for the current band) to the current reference band to generate motion-compensated reference band data. Adder 618 also performs interband addition using the motion-compensated reference band data and the decoded differences to generate an updated reference band. The updated reference band is stored in memory 620 for use as the reference band in encoding the corresponding band of another video frame.

Those skilled in the art will understand that, when decoding the quantized coefficients for intra blocks, the outputs of inverse block transform 616 are the decoded pixels for the updated reference band and motion-compensated adder 618 is disabled.

Bit-Rate Control

According to a preferred embodiment of the present invention, the encoder performs interleaved bit-rate control to determine a global quantization level for the current band.

By accounting for the different types of frames in a heterogeneous video stream, interleaved bit-rate control is able to provide improved perceived video quality (which is different from picture quality) by a judicious and controlled distribution of bits for the different picture types.

Interleaved bit-rate control (1) decomposes a given heterogeneous video stream into a set of interleaved homogeneous video substreams, (2) uses a prioritization mechanism for bit usage by the different substreams, (3) uses a "global-local bit bank" mechanism to recycle bits unused by one substream for use by other substreams, and (4) uses a predictive bit-rate controller with buffer fullness as the feedback mechanism for the bit-rate control of each substream and the global interleaved stream.

In a preferred embodiment, the heterogeneous video stream consists of three different frame types: intra (I), predicted (P), and bi-directional (B). The heterogeneous stream is decomposed into an I substream, a P substream, and a B substream. Four bit banks are maintained and actively monitored:

1. Global Bit Bank
2. I Bit Bank
3. P Bit Bank
4. B Bit Bank

During the encoding of each frame, a bit deposit equal to the number of bits for this frame type is made to this frame type's bit bank. The availability of bits in the bit bank is then accessed. If bits are available, they are used to encode the frame using a quantization predictor. If the actual number of bits used to encode the frame is less than the bits available, the surplus bits are passed on to the next frame type. The number of bits actually used are then deducted from the bit bank for that frame type. The global bit bank is also updated in exactly the same way.

The surplus bits spill order is as follows:

$$I \rightarrow P \rightarrow B \rightarrow I$$

After a I frame is encoded, any surplus bits are deposited in the P bit bank. Any surplus bits from encoding a P frame are deposited in the B bit bank, and any surplus bits from encoding a B frame are deposited in the I bit bank. There is a significance to this ordering. The I frame is given the highest priority since it is always encoded first and it impacts the encoding of both P and B frames. The P frame has second priority since it is encoded second and it impacts the encoding of only the subsequent B frames. The B frame is given last priority and its surplus bits are used by the next I frame. The preferred order in which surplus bits are shifted is therefore dictated by the relative priorities of the different frame types.

Figure 7:
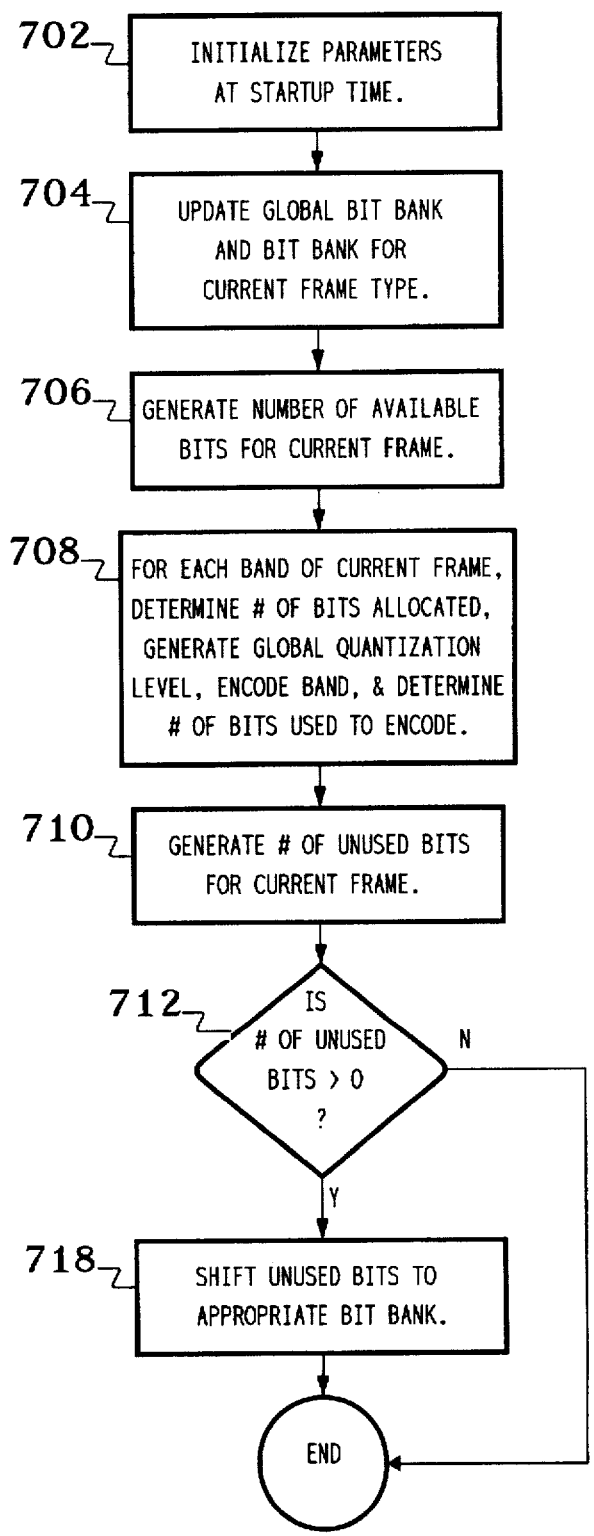
FIG. 7 is a flow diagram of the bit rate control processing implemented by the encoder of FIG. 5.

Referring now to FIG. 7, there is shown a flow diagram of the bit rate control processing implemented by the encoder, according to a preferred embodiment of the present invention. Steps 704–714 of FIG. 7 are implemented at run time for each frame.

There are three stages to the determination of the global quantization level for the current band. Stage I is executed at startup time while the remaining stages are executed at run time during the encoding of each frame.

Stage 1: Startup Time

The following parameters are initialized at startup time (step 702 of FIG. 7):

| | |
|---|---|
| o Bit Rate | Target bit rate per second (specified by application/user) |
| o Frame Rate | Number of frames per second (specified by application/user) |
| o Max Bit Buffer Size | Capacity of global bit bank (may be specified by application/user; default value = one half of Bit Rate) |
| o Global Bit Bank Fullness | Number of bits currently in global bit bank (initialized to Max Bit Buffer Size) |
| o IBitRatio | Relative capacity of I bit bank (preferably initialized to 10) |
| o PBitRatio | Relative capacity of P bit bank (preferably initialized to 5) |
| o BBitRatio | Relative capacity of B bit bank (preferably initialized to 2) |
| o I Bit Bank Fullness | Number of bits currently in I bit bank |
| o P Bit Bank Fullness | Number of bits currently in P bit bank |
| o B Bit Bank Fullness | Number of bits currently in B bit bank |
| o P-to-I Ratio | Number of P frames per I frame |
| o B-to-I Ratio | Number of B frames per I frame |
| o Band Y0 Bit Ratio | Relative allocation of bits to band Y0 |
| o Band Y1 Bit Ratio | Relative allocation of bits to band Y1 |
| o Band Y2 Bit Ratio | Relative allocation of bits to band Y2 |
| o Band Y3 Bit Ratio | Relative allocation of bits to band Y3 |
| o Band U Bit Ratio | Relative allocation of bits to band U |
| o Band V Bit Ratio | Relative allocation of bits to band V |

For the encoding sequence of(I1 B2 B3 P4 B5 B6 P7 B8 B9 P10 B11 B12 P13 B14 B15 I16 ... ), the number of P frames per I frame (P-to-I Ratio) is 4 and the number of B frames per I frame (B-to-I Ratio) is 10.

I, P, and B Bit Bank Fullnesses are preferably initialized as follows:

Denominator=IBitRatio+(PBitRatio*P-to-I Ratio)+ (BBitRatio*B-to-I Ratio)

I Bit Bank Fullness=Global Bit Bank Fullness*(IBitRatio/ Denominator)

P Bit Bank Fullness=Global Bit Bank Fullness*(PBitRatio/ Denominator)

B Bit Bank Fullness=Global Bit Bank Fullness* (BBitRatio/Denominator)

where Denominator represents the relative capacity of the global bit bank.

After the number of bits available for encoding the current frame are determined, those bits are distributed among the different bands of the frame. In a preferred embodiment, different numbers of bits may be distributed to the different bands. For example, in an encoding scheme having four Y bands (Y0, Y1, Y2, and Y3), one U band, and one V band, a relative band bit ratio is assigned to each band. In a preferred embodiment, the band bit ratios for bands Y0, Y1, Y2, Y3, U, and V are 9, 4, 2, 1, 2, and 2, respectively. The number of bits allocated to encode any one band i is determined from the total number of bits available for encoding the current frame as follows:

BitsForThisBand=BitsForThisFrame*Band i Bit Ratio/(sum of all Band i Bit Ratios)

The band is then be encoded based on the number of bits allocated to that band (BitsForThisBand).

The number of bits for the current frame type (BitsPerIFrame) is generated as follows:

BitsPerIFrame=(BitRate/FrameRate)*(IBitRatio/ Denominator)

BitsPerPFrame=(BitRate/FrameRate)*(PBitRatio/ Denominator)

BitsPerBFrame=(BitRate/FrameRate)*(BBitRatio/ Denominator)

Stage 2: Run Time

This stage is implemented at run time, once for each frame being encoded. In this stage, the global bit bank and the bit bank for the current frame type are adjusted by adding the target number of bits for the current frame and subtracting the actual number of bits used to encode the previous frame of the same frame type (step 704). Pseudo code for Stage 2 is as follows:

```
Switch( Frame Type )
{
    case I Frame:
    {
        I Bit Bank Fullness       += BitsPerIFrame -
                                     BitsPerLastIFrame
        Global Bit Bank Fullness  += BitsPerIFrame -
                                     BitsPerLastIFrame
    }
    break
    case P Frame:
    {
        P Bit Bank Fullness       += BitsPerPFrame -
                                     BitsPerLastPFrame
        Global Bit Bank Fullness  += BitsPerPFrame -
                                     BitsPerLastPFrame
    }
    break
    case B Frame:
    {
        B Bit Bank Fullness       += BitsPerBFrame -
                                     BitsPerLastBFrame
        Global Bit Bank Fullness  += BitsPerBFrame -
                                     BitsPerLastBFrame
    }
}
```

Stage 3: Run Time

In this stage, the global quantization level for the current frame is selected based on the fullness of the current frame's bit bank. Pseudo-code for Stage 3 is as follows:

```
switch( FrameType )
{
case I Frame:
{
if( IBitBankFullness>0 )
{
    BitsForThisFrame        = IBitBankFullness * w +
                              BitsPerIFrame * (1-w) //
                              Step 706 of Fig. 7
    For each band i in current I frame // Step 708
    {
        BitsForThisBand =
        BitsForThisFrame * Band i Bit Ratio /
        (sum of all Band i Bit Ratios)
        GlobalQuant =
        PredictQuant(BitsForThisBand,
        GlobalSAD, I Frame)
        BitsUsedThisBand =
        encode_band (GlobalQuant)
        BitsUsedThisFrame +=
        BitsUsedThisBand
    }
    UnusedBits              = BitsForThisFrame -
                              BitsUsedThisFrame // Step 710
    if( UnusedBits>0 ) // Step 712
    {
        // Step 714
        IBitBankFullness    -= UnusedBits;
        PBitBankFullness    += UnusedBits;
    }
}
break
}
case P Frame:
{
```

```
if( PBitBankFullness>0)
{
    BitsForThisFrame        = PBitBankFullness * w +
                              BitsPerPFrame * (1-w) // Step 706
    For each band i in current P frame // Step 708
    {
        BitsForThisBand =
        BitsForThisFrame * Band i Bit Ratio /
        (sum of all Band i Bit Ratios)
        GlobalQuant =
        PredictQuant(BitsForThisBand,
        GlobalSAD, P Frame)
        BitsUsedThisBand =
        encode_band (GlobalQuant)
        BitsUsedThisFrame +=
        BitsUsedThisBand
    }
    UnusedBits              = BitsForThisFrame -
                              BitsUsedThisFrame // Step 710
    if( UnusedBits>0 ) // Step 712
    {
        // Step 714
        PBitBankFullness    -= UnusedBits;
        BBitBankFullness    += UnusedBits;
    }
}
break
}
case B Frame:
{
    if( BBitBankFullness>0 )
    {
        BitsForThisFrame    = BBitBankFullness * w +
                              BitsPerBFrame * (1-w) // Step 706
        For each band i in current B frame // Step 708
        {
            BitsForThisBand =
            BitsForThisFrame * Band i Bit Ratio /
            (sum of all Band i Bit Ratios)
            GlobalQuant =
            PredictQuant(BitsForThisBand,
            GlobalSAD, B Frame)
            BitsUsedThisBand =
            encode_band (GlobalQuant)
            BitsUsedThisFrame +=
            BitsUsedThisBand
        }
        UnusedBits          = BitsForThisFrame -
                              BitsUsedThisFrame // Step 710
        if( UnusedBits>0 ) // Step 712
        {
            // Step 714
            BBitBankFullness  -= UnusedBits;
            IBitBankFullness  += UnusedBits;
        }
    }
    break
}
}
```

The value of w is used to control how reactive the bit rate controller is to mispredictions. w=1 results in a maximally reactive controller, while w=0 results in a non-reactive controller. A preferred value is w=0.5.

The global quantization level for the current band (GlobalQuant) is generated using the PredictQuant function. PredictQuant predicts the global quantization to achieve the specified number of bits for this band (BitsForThisBand) for the current frame type and a global activity measure for the band (GlobalSAD). A preferred mechanism for this prediction is described in U.S. Pat. Application No. 08/267,161, now U.S. Pat. No. 5,491,513, filed on Jun. 28, 1994 as attorney docket no. 366403-831, the teachings of which are incorporated herein by reference.

If the bit bank fullness of the current frame type is less than or equal to zero, then the current frame is skipped. In that case, the bits for the current frame get deposited into the bit bank for the next frame, which is encoded as the same type of frame that the skipped frame was supposed to be. That is, for example, if the current frame is an I frame and I Bit Bank Fullness is not greater than zero, then the current frame is skipped, the average number of bits per frame (i.e., Bit Rate / Frame Rate) are deposited into both I Bit Bank Fullness and Global Bit Bank Fullness, and the next frame is encoded as an I frame.

By maintaining separate bit banks for each different type of frame in the heterogeneous stream, the interleaved bit rate control is able to allocate bits more efficiently to the different frames. It also allows the allocation of bits to take into account different priorities between the different types of frames. As a result, the perceived quality of the decoded video stream can be improved.

Decode Processing

Referring now to FIG. 8, there is shown a process flow diagram of the decompression processing implemented by decode system 200 of FIG. 2 for each encoded frame of the encoded video bitstream, according to a preferred embodiment of the present invention. For each encoded frame of the encoded video bitstream, decode processing is applied to each of the encoded bands (step 802 of FIG. 8). In the case where the Y-component plane was decomposed into four bands during encoding, an inverse transform is applied to the four decoded Y-component bands to generate the decoded Y-component plane (step 804). The decoded Y-component plane data are then processed with the decoded U- and V-component plane data to generate a decoded video image for display. A preferred inverse transform is described in further detail in the '091 application in the section entitled "Wavelet Transform."

Referring now to FIG. 9, there is shown a block diagram of a decoder that implements the decompression processing of FIG. 8. Bitstream parser 902 parses the embedded bitstream into the encoded band sequences. Decoders 904 decode the bands of encoded data for each frame and inverse wavelet transform 906 applies the preferred inverse wavelet transform to the decoded Y-component bands to generate the decoded Y-component plane. In a preferred embodiment, there is a single decoder 904 that sequentially decodes the different encoded bands.

Referring now to FIG. 10, there is shown a block diagram of the decode processing of step 802 of FIG. 8 that is applied to the difference blocks of each encoded band of each inter-encoded frame of the encoded video bitstream, according to one embodiment of the present invention. The decode processing of FIG. 10 reverses the encode processing of FIG. 6. In particular, Huffman decoder 1002 applies statistical decoding to the encoded data for the current band to reconstruct the run-length encoded run/val data. The processing of Huffman decoder 1002 is described in further detail in the '091 application in the section entitled "Statistical Decoding."

Run-length decoder 1004 transforms the RLE data into quantized coefficients. Inverse quantizer 1006 dequantizes the quantized coefficients to generate dequantized coefficients. Inverse block transform 1008 applies the inverse of forward block transform 606 of FIG. 6 to the dequantized coefficients to generate decoded differences.

Motion-compensated adder 1010 applies the decoded motion vectors to the reference band to generate motion-compensated reference band data, and performs inter-band addition using the motion-compensated reference band data and the decoded differences to generate the decoded data for the current band. The decoded band is then stored in memory 1012 for use as the reference band for decoding the corresponding band of another video frame. If the decoded band corresponds to a Y-component band, the decoded band is also used to reconstruct the decoded Y-component plane (step 804 of FIG. 8). Otherwise, the decoded band is either the decoded U- or V-component plane. In any case, the decoded band is used to generate the decoded image for display.

The decoding for intra blocks is equivalent to the decoding for difference blocks shown in FIG. 10, except that the motion-compensated adding of 1010 is not performed. In that case, the outputs of inverse block transform 1008 are the decoded pixels for the updated reference band. Intra decoding is applied to all of the blocks of K and I frames as well as the intra blocks of D and B frames.

In the preferred embodiment of the present invention, the bitrate controller for encoding video sequences is used to select quantization levels used to encode the bands of video frames. In general, the present invention may alternatively be used to generate encoding parameter values other than quantization levels.

Similarly, in the preferred embodiment, the different types of video frames are assigned different bit allocations in terms of bits per frame type, and different types of bands within a frame are assigned different bit allocations in terms of bits per band type. Bits per frame type and bits per band type are just one way to represent the relative priorities of the different types of frames. Other representations are also possible under the present invention.

As described above, the present invention can be implemented as a bitrate controller for encoding interleaved video sequences. Those skilled in the art will understand that the present invention can be implemented to encode interleaved data streams other than those that have only video substreams. In general, the present invention could be used to encode any interleaved multimedia stream having two or more different types of substreams. For example, the different possible types of substreams include video, audio, 3D, transparency, or midi (i.e., computer-generated audio streams) substreams.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding multimedia signals, comprising the steps of:
   (a) providing a heterogeneous multimedia stream comprising interleaved samples of two or more different substream types;
   (b) maintaining a different bit bank for each different substream type;
   (c) generating an encoding parameter value for a current sample based on the bit bank corresponding to the substream type of the current sample; and
   (d) encoding the current sample using the encoding parameter value to generate an encoded multimedia bitstream.

2. The process of claim 1, wherein step (b) further comprises the step of maintaining a global bit bank and step (c) comprises the step of generating the encoding parameter value for the current sample based on the global bit bank and the bit bank corresponding to the current substream type.

3. The process of claim 1, wherein each of the substreams of the heterogeneous multimedia stream is one of a video substream, an audio substream, a three-dimensional stream, a transparency stream, and a midi stream.

4. The process of claim 1, wherein the heterogeneous multimedia stream comprises intra-encoded video frames and inter-encoded video frames and the encoding parameter is quantization level.

5. The process of claim 4, wherein the heterogeneous multimedia stream comprises uni-directional inter-encoded video frames and bi-directional inter-encoded video frames.

6. The process of claim 1, wherein each substream type is allocated a priority for encoding.

7. The process of claim 6, wherein the priority for each substream type is expressed as a relative number of bits to be allocated for encoding.

8. The process of claim 1, wherein step (b) comprises the further step of determining a number of bits available for encoding the current sample, and further comprising the steps of:
   (e) determining a number of bits used to encode the current sample;
   (f) generating a number of unused bits for the current sample from the number of bits available for encoding the current sample and the number of bits used to encode the current sample; and
   (g) shifting the number of unused bits from the bit bank corresponding to the current substream type to a bit bank for a different substream type.

9. The process of claim 8, wherein:
   step (b) further comprises the step of maintaining a global bit bank;
   step (c) comprises the step of generating the encoding parameter value for the current sample based on the global bit bank and the bit bank corresponding to the current substream type;
   each of the substreams of the heterogeneous multimedia stream is one of a video substream, an audio substream, a three-dimensional stream, a transparency stream, and a midi stream;
   the heterogeneous multimedia stream comprises intra-encoded video frames, uni-directional inter-encoded video frames, and bi-directional inter-encoded video frames;
   the encoding parameter is quantization level; and
   each substream type is allocated a priority for encoding expressed as a relative number of bits to be allocated for encoding.

10. An apparatus for encoding multimedia signals, comprising:
    (a) means for providing a heterogeneous multimedia stream comprising interleaved samples of two or more different substream types;

(b) means for maintaining a different bit bank for each different substream type;

(c) means for generating an encoding parameter value for a current sample based on the bit bank corresponding to the substream type of the current sample; and (d) means for encoding the current sample using the encoding parameter value to generate an encoded multimedia bitstream.

11. The apparatus of claim 10, wherein means (b) maintains a global bit bank and means (c) generates the encoding parameter value for the current sample based on the global bit bank and the bit bank corresponding to the current substream type.

12. The apparatus of claim 10, wherein each of the substreams of the heterogeneous multimedia stream is one of a video substream, an audio substream, a three-dimensional stream, a transparency stream, and a midi stream.

13. The apparatus of claim 10, wherein the heterogeneous multimedia stream comprises intra-encoded video frames and inter-encoded video frames and the encoding parameter is quantization level.

14. The apparatus of claim 13, wherein the heterogeneous multimedia stream comprises unidirectional inter-encoded video frames and bi-directional inter-encoded video frames.

15. The apparatus of claim 10, wherein each substream type is allocated a priority for encoding.

16. The apparatus of claim 15, wherein the priority for each substream type is expressed as a relative number of bits to be allocated for encoding.

17. The apparatus of claim 10, wherein means (b) determines a number of bits available for encoding the current sample, and further comprising:

(e) means for determining a number of bits used to encode the current sample;

(f) means for generating a number of unused bits for the current sample from the number of bits available for encoding the current sample and the number of bits used to encode the current sample; and (g) means for shifting the number of unused bits from the bit bank corresponding to the current substream type to a bit bank for a different substream type.

18. The apparatus of claim 17, wherein:

means (b) maintains a global bit bank;

means (c) generates the encoding parameter value for the current sample based on the global bit bank and the bit bank corresponding to the current substream type;

each of the substreams of the heterogeneous multimedia stream is one of a video substream, an audio substream, a three-dimensional stream, a transparency stream, and a midi stream;

the heterogeneous multimedia stream comprises intra-encoded video frames, uni-directional inter-encoded video frames, and bi-directional inter-encoded video frames;

the encoding parameter is quantization level; and each substream type is allocated a priority for encoding expressed as a relative number of bits to be allocated for encoding.

19. A storage medium having stored thereon a plurality of instructions for encoding multimedia signals, wherein the plurality of instructions, when executed by a processor of a computer, cause the processor to perform the steps of:

(a) providing a heterogeneous multimedia stream comprising interleaved samples of two or more different substream types;

(b) maintaining a different bit bank for each different substream type;

(c) generating an encoding parameter value for a current sample based on the bit bank corresponding to the substream type of the current sample; and (d) encoding the current sample using the encoding parameter value to generate an encoded multimedia bitstream.

20. The storage medium of claim 19, wherein step (b) further comprises the step of maintaining a global bit bank and step (c) further comprises the step of generating the encoding parameter value for the current sample based on the global bit bank and the bit bank corresponding to the current substream type.

21. The storage medium of claim 19, wherein each of the substreams of the heterogeneous multimedia stream is one of a video substream, an audio substream, a three-dimensional stream, a transparency stream, and a midi stream.

22. The storage medium of claim 19, wherein the heterogeneous multimedia stream comprises intra-encoded video frames and inter-encoded video frames and the encoding parameter is quantization level.

23. The storage medium of claim 22, wherein the heterogeneous multimedia stream comprises uni-directional inter-encoded video frames and bi-directional inter-encoded video frames.

24. The storage medium of claim 19, wherein each substream type is allocated a priority for encoding.

25. The storage medium of claim 24, wherein the priority for each substream type is expressed as a relative number of bits to be allocated for encoding.

26. The storage medium of claim 19, wherein step (b) comprises the further step of determining a number of bits available for encoding the current sample; and the plurality of instructions causes the processor to execute the further steps of:

(e) determining a number of bits used to encode the current sample;

(f) generating a number of unused bits for the current sample from the number of bits available for encoding the current sample and the number of bits used to encode the current sample; and (g) shifting the number of unused bits from the bit bank corresponding to the current substream type to a bit bank for a different substream type.

27. The storage medium of claim 26, wherein:

step (b) comprises the step of maintaining a global bit bank;

step (c) comprises the step of generating the encoding parameter value for the current sample based on the global bit bank and the bit bank corresponding to the current substream type;

each of the substreams of the heterogeneous multimedia stream is one of a video substream, an audio substream, a three-dimensional stream, a transparency stream, and a midi stream;

the heterogeneous multimedia stream comprises intra-encoded video frames, uni-directional inter-encoded video frames, and bi-directional inter-encoded video frames;

the encoding parameter is quantization level; and each substream type is allocated a priority for encoding expressed as a relative number of bits to be allocated for encoding.

28. A computer-implemented process for decoding encoded multimedia signals, comprising the steps of:
(1) providing an encoded multimedia bitstream; and
(2) decoding the encoded multimedia bitstream to generate a decoded multimedia stream; wherein the encoded multimedia bitstream has been generated by the steps of:
  (a) providing a heterogeneous multimedia stream comprising interleaved samples of two or more different substream types;
  (b) maintaining a different bit bank for each different substream type;
  (c) generating an encoding parameter value for a current sample based on the bit bank corresponding to the substream type of the current sample; and
  (d) encoding the current sample using the encoding parameter value to generate an encoded multimedia bitstream.

29. The process of claim 28, wherein step (b) further comprises the step of maintaining a global bit bank and step (c) comprises the step of generating the encoding parameter value for the current sample based on the global bit bank and the bit bank corresponding to the current substream type.

30. The process of claim 28, wherein each of the substreams of the heterogeneous multimedia stream is one of a video substream, an audio substream, a three-dimensional stream, a transparency stream, and a midi stream.

31. The process of claim 28, wherein the heterogeneous multimedia stream comprises intra-encoded video frames and inter-encoded video frames and the encoding parameter is quantization level.

32. The process of claim 31, wherein the heterogeneous multimedia stream comprises uni-directional inter-encoded video frames and bi-directional inter-encoded video frames.

33. The process of claim 28, wherein each substream type is allocated a priority for encoding.

34. The process of claim 33, wherein the priority for each substream type is expressed as a relative number of bits to be allocated for encoding.

35. The process of claim 28, wherein step (b) comprises the further step of determining a number of bits available for encoding the current sample, and further comprising the steps of:
  (e) determining a number of bits used to encode the current sample;
  (f) generating a number of unused bits for the current sample from the number of bits available for encoding the current sample and the number of bits used to encode the current sample; and
  (g) shifting the number of unused bits from the bit bank corresponding to the current substream type to a bit bank for a different substream type.

36. The process of claim 35, wherein:
step (b) further comprises the step of maintaining a global bit bank;
step (c) comprises the step of generating the encoding parameter value for the current sample based on the global bit bank and the bit bank corresponding to the current substream type;
each of the substreams of the heterogeneous multimedia stream is one of a video substream, an audio substream, a three-dimensional stream, a transparency stream, and a midi stream;
the heterogeneous multimedia stream comprises intra-encoded video frames, uni-directional inter-encoded video frames, and bi-directional inter-encoded video frames;
the encoding parameter is quantization level; and
each substream type is allocated a priority for encoding expressed as a relative number of bits to be allocated for encoding.

37. An apparatus for decoding encoded multimedia signals, comprising:
(1) means for providing an encoded multimedia bitstream; and
(2) means for decoding the encoded multimedia bitstream to generate a decoded multimedia stream; wherein the encoded multimedia bitstream has been generated by the steps of:
  (a) providing a heterogeneous multimedia stream comprising interleaved samples of two or more different substream types;
  (b) maintaining a different bit bank for each different substream type;
  (c) generating an encoding parameter value for a current sample based on the bit bank corresponding to the substream type of the current sample; and
  (d) encoding the current sample using the encoding parameter value to generate an encoded multimedia bitstream.

38. The apparatus of claim 37, wherein step (b) further comprises the step of maintaining a global bit bank and step (c) comprises the step of generating the encoding parameter value for the current sample based on the global bit bank and the bit bank corresponding to the current substream type.

39. The apparatus of claim 37, wherein each of the substreams of the heterogeneous multimedia stream is one of a video substream, an audio substream, a three-dimensional stream, a transparency stream, and a midi stream.

40. The apparatus of claim 37, wherein the heterogeneous multimedia stream comprises intra-encoded video frames and inter-encoded video frames and the encoding parameter is quantization level.

41. The apparatus of claim 40, wherein the heterogeneous multimedia stream comprises uni-directional inter-encoded video frames and bi-directional inter-encoded video frames.

42. The apparatus of claim 37, wherein each substream type is allocated a priority for encoding.

43. The apparatus of claim 42, wherein the priority for each substream type is expressed as a relative number of bits to be allocated for encoding.

44. The apparatus of claim 37, wherein step (b) comprises the further step of determining a number of bits available for encoding the current sample, and further comprising the steps of:
  (e) determining a number of bits used to encode the current sample;
  (f) generating a number of unused bits for the current sample from the number of bits available for encoding the current sample and the number of bits used to encode the current sample; and
  (g) shifting the number of unused bits from the bit bank corresponding to the current substream type to a bit bank for a different substream type.

45. The apparatus of claim 44, wherein:
step (b) further comprises the step of maintaining a global bit bank;
step (c) comprises the step of generating the encoding parameter value for the current sample based on the global bit bank and the bit bank corresponding to the current substream type;

each of the substreams of the heterogeneous multimedia stream is one of a video substream, an audio substream, a three-dimensional stream, a transparency stream, and a midi stream;

the heterogeneous multimedia stream comprises intra-encoded video frames, uni-directional inter-encoded video frames, and bi-directional inter-encoded video frames;

the encoding parameter is quantization level; and each substream type is allocated a priority for encoding expressed as a relative number of bits to be allocated for encoding.

46. A storage medium having stored thereon a plurality of instructions for decoding encoded multimedia signals, wherein the plurality of instructions, when executed by a processor of a computer cause the processor to perform the steps of:

(1) providing an encoded multimedia bitstream; and (2) decoding the encoded multimedia bitstream to generate a decoded multimedia stream; wherein the encoded multimedia bitstream has been generated by the steps of:

(a) providing a heterogeneous multimedia stream comprising interleaved samples of two or more different substream types;

(b) maintaining a different bit bank for each different substream type;

(c) generating an encoding parameter value for a current sample based on the bit bank corresponding to the substream type of the current sample; and (d) encoding the current sample using the encoding parameter value to generate an encoded multimedia bitstream.

47. The storage medium of claim 46, wherein step (b) further comprises the step of maintaining a global bit bank and step (c) comprises the step of generating the encoding parameter value for the current sample based on the global bit bank and the bit bank corresponding to the current substream type.

48. The storage medium of claim 46, wherein each of the substreams of the heterogeneous multimedia stream is one of a video substream, an audio substream, a three-dimensional stream, a transparency stream, and a midi stream.

49. The storage medium of claim 46, wherein the heterogeneous multimedia stream comprises intra-encoded video frames and inter-encoded video frames and the encoding parameter is quantization level.

50. The storage medium of claim 49, wherein the heterogeneous multimedia stream comprises uni-directional inter-encoded video frames and bi-directional inter-encoded video frames.

51. The storage medium of claim 46, wherein each substream type is allocated a priority for encoding.

52. The storage medium of claim 51, wherein the priority for each substream type is expressed as a relative number of bits to be allocated for encoding.

53. The storage medium of claim 46, wherein step (b) comprises the further step of determining a number of bits available for encoding the current sample, and further comprising the steps of:

(e) determining a number of bits used to encode the current sample;

(f) generating a number of unused bits for the current sample from the number of bits available for encoding the current sample and the number of bits used to encode the current sample; and (g) shifting the number of unused bits from the bit bank corresponding to the current substream type to a bit bank for a different substream type.

54. The storage medium of claim 53, wherein:

step (b) further comprises the step of maintaining a global bit bank;

step (c) comprises the step of generating the encoding parameter value for the current sample based on the global bit bank and the bit bank corresponding to the current substream type;

each of the substreams of the heterogeneous multimedia stream is one of a video substream, an audio substream, a three-dimensional stream, a transparency stream, and a midi stream;

the heterogeneous multimedia stream comprises intra-encoded video frames, uni-directional inter-encoded video frames, and bi-directional inter-encoded video frames;

the encoding parameter is quantization level; and each substream type is allocated a priority for encoding expressed as a relative number of bits to be allocated for encoding.

* * * * *